US012688735B2

(12) United States Patent
Mazurek et al.

(10) Patent No.: US 12,688,735 B2
(45) Date of Patent: Jul. 21, 2026

(54) FACILITATING RESPONSE TO EMERGENT SITUATION AT VEHICLE WITH VEHICLE CONTEXT

(71) Applicant: FCA US LLC, Auburn Hills, MI (US)

(72) Inventors: Matthew J Mazurek, Rochester Hills, MI (US); Laurent Dizambourg, Gif sur Yvette (FR); Saleh Bensator, Puteaux (FR)

(73) Assignee: FCA US LLC, Auburn Hills, MI (US)

( * ) Notice: Subject to any disclaimer, the term of this patent is extended or adjusted under 35 U.S.C. 154(b) by 149 days.

(21) Appl. No.: 18/514,341

(22) Filed: Nov. 20, 2023

(65) Prior Publication Data

US 2025/0166423 A1 May 22, 2025

(51) Int. Cl.
*G07C 5/00* (2006.01)
*G07C 5/08* (2006.01)
*H04L 12/40* (2006.01)

(52) U.S. Cl.
CPC ........... *G07C 5/008* (2013.01); *G07C 5/0808* (2013.01); *G07C 5/085* (2013.01); *H04L 12/40* (2013.01); *H04L 2012/40215* (2013.01); *H04L 2012/40273* (2013.01)

(58) Field of Classification Search
CPC ................................. G07C 5/008; H04L 12/40

USPC ......................................................... 701/31.4
See application file for complete search history.

(56) References Cited

U.S. PATENT DOCUMENTS

| | | | |
|---|---|---|---|
| 2019/0057558 A1* | 2/2019 | Gupta | B60W 50/04 |
| 2020/0023797 A1* | 1/2020 | Volos | B60R 21/013 |
| 2022/0227389 A1* | 7/2022 | Tam | G05D 1/617 |

* cited by examiner

*Primary Examiner* — Navid Z. Mehdizadeh

(74) *Attorney, Agent, or Firm* — Jeremy J. Klobucar

(57) ABSTRACT

An emergent situation vehicle response system and method of facilitating a response to an emergent situation at a vehicle. The emergent situation vehicle response system includes at least one sensor and an onboard communications network for transmitting sensor data captured by the at least one sensor, as well as a responder subsystem having a responder computer configured to provide electronic data to a responder stationed at the responder computer. The emergent situation vehicle response system is configured to perform the method, including detecting an emergent situation at the vehicle; in response to detecting the emergent situation at the vehicle, obtain snapshot data that is generated based on a snapshot of sensor data being transmitted over an onboard communications network; and providing the snapshot data and an indication of the emergent situation to the responder subsystem located remotely and separate from the vehicle.

20 Claims, 2 Drawing Sheets

*200*

*210*
Detect Emergent Situation at Vehicle

*220*
In Response to Detecting the Emergent Situation at the Vehicle, Obtain Snapshot Data of Onboard Communications Network

*230*
Generate Contextualized Snapshot Data based in the Snapshot Data

*240*
Contextualized Snapshot Data is Provided to Operator of Responder Subsystem

FACILITATING RESPONSE TO EMERGENT SITUATION AT VEHICLE WITH VEHICLE CONTEXT

FIELD

The present disclosure relates to a facilitating a response to an emergent situation at a vehicle.

BACKGROUND

Modern vehicles, such as automobiles, have experienced significant advancements, evolving into relatively sophisticated electronic systems that often include an array of various sensors and connectivity means. These vehicles are now capable of interfacing with remote systems through technologies like cellular, dedicated short-range wireless communications, or other V2X communications, allowing them to communicate with other vehicles and infrastructure, receive real-time updates and perform remote diagnostics, significantly enhancing user experience and safety. Moreover, the array of sensors, perform diverse roles from environmental monitoring to emergency detection, and health monitoring. Oftentimes, autonomous vehicles include a wide variety of sensors of different types, such as radar, LiDAR, cameras, etc. These sensors are generally installed on the vehicle for one or more predetermined purposes, such as for providing the vehicle driver or passenger with information about the vehicle's operation or environment.

Vehicles are generally equipped to carry out responsive actions to certain predetermined events. However, in some instances, it is difficult for an individual, such as one remotely-located from the vehicle, to assess the totality of the situation. Accordingly, there is a need to provide a responder (or operator) with more context as to an event occurring at the vehicle, particularly emergency events where time may be of the essence, so as to facilitate the response by the responder.

SUMMARY

In at least some implementations, a method of facilitating a response to an emergent situation at a vehicle is provided. The method includes: detecting an emergent situation at a vehicle; in response to detecting the emergent situation at the vehicle, obtaining snapshot data that is generated based on a snapshot of sensor data being transmitted over an onboard communications network; and providing the snapshot data and an indication of the emergent situation to a responder subsystem located remotely and separate from the vehicle.

In at least some implementations, an emergent situation vehicle response system is provided. The emergent situation vehicle response system includes: vehicle electronics of a vehicle, including at least one sensor and an onboard communications network for transmitting sensor data captured by the at least one sensor; and a responder subsystem having a responder computer configured to provide electronic data to an operator stationed at the responder computer, the responder computer being located remotely and separate from the vehicle electronics. The emergent situation vehicle response system is configured to execute computer instructions that, when executed by one or more electronic processors, cause the emergent situation vehicle response system to: detect an emergent situation at the vehicle; in response to detecting the emergent situation at the vehicle, obtain snapshot data that is generated based on a snapshot of the sensor data captured by the at least one sensor as the sensor data is being transmitted over an onboard communications network; and provide the snapshot data and an indication of the emergent situation to the responder computer.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

The system and method provided herein facilitate responding to an emergent situation at a vehicle, such as an accident of a passenger automobile or other emergency or other event for which a swift response is desired. The system, which may be referred to as an emergent situation vehicle response system, is configured to perform the method, which is a method of facilitating a response to an emergent situation at a vehicle, and which includes: detecting an emergent situation at a vehicle; in response to detecting the emergent situation at the vehicle, obtaining snapshot data that provides a snapshot of sensor data being transmitted over an onboard communications network; and sending the snapshot data to a responder subsystem configured to present the snapshot data and an indication of the emergent situation to a human operator, referred to herein also simply as "operator".

In embodiments, the method further includes sending autonomous vehicle plan data to the responder subsystem for presentation to the operator along with the snapshot data. This provides the operator with more information about the emergent situation thereby facilitating the operator's decision to make a responsive action, namely improving the speed and response time, at least in some embodiments.

In embodiments, the method further includes generating contextualized snapshot data based on the snapshot data, and then sending the contextualized snapshot data to the operator. The contextualized snapshot data is a representation of the snapshot data that is generated by transforming raw sensor values from the snapshot data into semantically meaningful and interpretable outputs, which are readily understandable by operator. This provides the operator with more information about the emergent situation thereby facilitating the operator's decision to make a responsive action, namely improving the speed and response time, at least in some embodiments.

Figure 1:
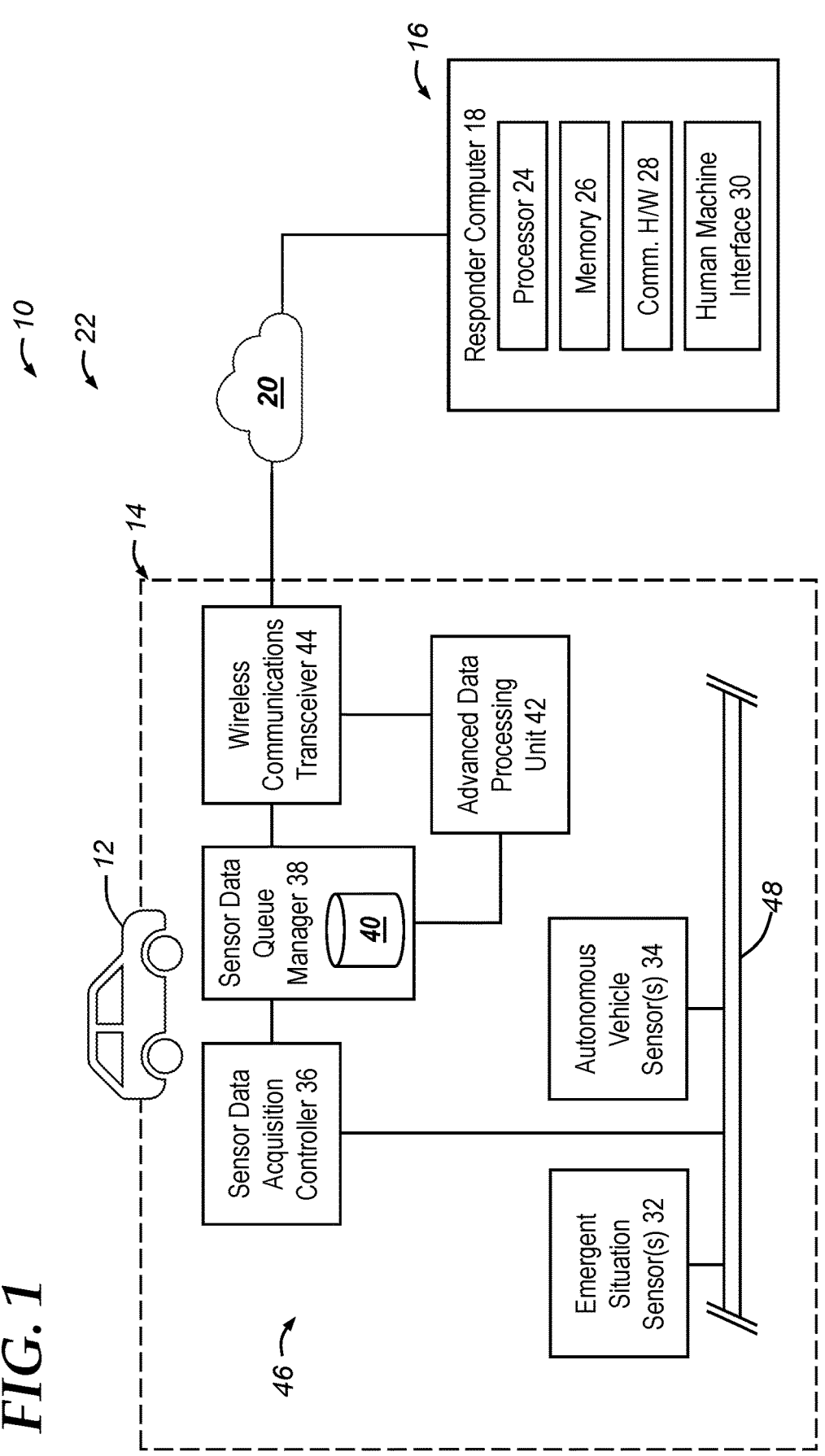
FIG. 1 is a block diagram of a vehicle communications network having an emergent situation vehicle response system that includes vehicle electronics of a vehicle and a responder subsystem, according to one embodiment.

With reference to the drawings, more particularly, FIG. 1, there is shown a vehicle communications network 10 having a vehicle 12 with vehicle hardware or electronics 14, a responder subsystem 16 having a computer (referred to as a "responder computer") 18, and an interconnected communications network 20, such as the internet. The communications network 10 is also shown as including an emergent situation vehicle response system 22, which may include the vehicle electronics 14 (or portions thereof) and the responder subsystem 16 (or portions thereof).

The responder subsystem 16 is for receiving emergent situation indications from one or more vehicles, often a plurality of vehicles, such as fleets or vehicles. The responder subsystem 16 includes a responder computer 18, which is used for receiving the emergent situation indications and presenting these indications to the operator stationed at the responder subsystem 16. The responder computer 18 includes at least one processor 24, memory or storage 26, communications hardware (H/W) 28, and at least one human machine interface (HMI) 30. The responder computer 18 may include various other components, according to embodiments. In some embodiments, the responder subsystem 16 includes a plurality of responder computers, although the depicted embodiment of FIG. 1 shows a single responder computer 18 for purposes of brevity.

The at least one processor 24 of the responder computer 18 is used to execute computer instructions stored in memory 26, which, when executed, cause the responder subsystem 18 to carry out its intended functionality. It will be appreciated that, embodiments may employ multiple responder computers for performing the functionality of the responder subsystem 18, such as where different machines are used for different functionality.

Each of the at least one processor 24 is an electronic processor, and may be any suitable electronic processor, such as: x86/x86-64 processors, such as Intel™ Core series and AMD Ryzen™ series, widely adopted in the personal computing domain; or ARM processors, such as Qualcomm Snapdragon™, NVIDIA Tegra™, and Apple M1™ processors, common for mobile and embedded systems. It will be appreciated that these are examples, as other electronic processors may be used.

The memory 26 is a non-transitory, computer-readable medium that is implemented as a non-volatile computer data storage device, such as, for example, ROM (read-only memory), solid-state drives (SSDs) (including other solid-state storage such as solid-state hybrid drives (SSHDs)), other types of flash memory, hard disk drives (HDDs), magnetic or optical disc drives, non-volatile random access memory (NVRAM), etc.

The communications hardware 28 is an electronic device that is used for carrying out communications, such as ethernet (TCP/IP) or other wired communications, cellular carrier communications (or other long-range wireless communications), and/or dedicated short-range communications (DSRC) (e.g., Wi-Fi™, Bluetooth™) (or other short-range wireless communications). In embodiments, the communications hardware 28 is or includes a network adapter installed on the responder computer 18. The communications hardware 28 enables the responder subsystem 16 to connect to other networks (non-local networks), such as the internet, which may be used to send messages or data between the vehicle 12 and the responder subsystem 16.

Each of the at least one HMI (also referred to as HMI(s)) 30 is used to communicate information between the operator, who may be stationed at the responder computer 18, and the responder subsystem 16. At least one of the HMI(s) 30 is an output device in that it provides an output from the responder computer 18 to the operator. Examples include display screens, speakers, printers, and LED indicators. In embodiments, at least one of the HMI(s) 30 is an input device in that it allows the operator to provide an input to the responder computer 18. Examples include keyboards, computer mice, touchscreens, other displays, and microphones.

The interconnected communications network 20 is used for enabling communications between the vehicle electronics 14 and the responder subsystem 16. The interconnected communications network 20 is shown as a single cloud icon in FIG. 1, as those skilled in the art will appreciate that any suitable data communications network may be used as the interconnected communications network 20, and this oftentimes involves use of cellular infrastructure and/or internet infrastructure. Here, "cellular infrastructure" refers to cell towers, mobile switching centers, carrier core networks, and other equipment and/or components used for carrying out cellular communications. And, here, "internet infrastructure" refers to one or more interconnected computer networks that use the Internet protocol (IP) suite (e.g., TCP/IP, UDP/IP) to communicate between networks and devices so as to facilitate data exchange. In embodiments, other infrastructures and/or any combination thereof may be used as well for the interconnected communications network 20.

In the present embodiment of FIG. 1, the vehicle electronics 14 include one or more emergent situation sensors (referred to also as "emergent situation sensor(s)") 32, one or more autonomous vehicle sensors (referred to also as "autonomous vehicle sensor(s)") 34, a sensor data acquisition controller 36, a sensor data queue manager 38, a sensor data store 40, an advanced data processing unit 42, a wireless communications transceiver 44, and an onboard communications network 46. The vehicle electronics 14 may include various other components, according to embodiments, such as other sensors, computers, etc.

The components 32-44 of the vehicle electronics 14 are shown as being communicatively coupled to one another in FIG. 1, with the sensors 32,34 connected directly to a communications bus 48, such as a controller area network (CAN) or ethernet bus, over which sensor data captured by the sensors 32,34 is transmitted. The communications bus 48 is a hardwired bus, such as an ethernet or CAN twisted pair, and this communications bus 48 may be used for transmitting other vehicle state information in addition to the sensor data. The onboard communications network 46 may further include other network components in addition to the communications bus 48, such as wireless network adapters used to carry out dedicated short-range wireless communications (e.g., Bluetooth™, Wi-Fi™).

According to embodiments, sensor data communicated over the communications bus 48, where, at a given instant in time, the communications bus 48 includes sensor data captured by the sensors 32, 34. The communications bus 48 may include other data beside sensor data, such vehicle state information indicating an autonomous state of the vehicle 12.

The emergent situation sensor(s) 32 are each a sensor onboard the vehicle 12 and configured to obtain sensor data used to detect an emergent situation. The emergent situation sensor(s) 32 may include: airbag sensors for responding to rapid deceleration to deploy airbags; gyroscopes and accelerometers that detect changes in vehicle orientation and speed, sensing possible rollovers or impacts; and cameras or other image sensors that monitor external and internal conditions of the vehicle, such as observing driver behavior and the vehicle's surroundings to detect potential collisions or other emergent situations. It will be appreciated that other emergent situation sensors may be used, according to embodiments. The sensor data captured by the emergent situation sensor(s) 32 may be communicated over the onboard communications network 46, such as over the communications bus 48.

The autonomous vehicle sensor(s) 34 are each a sensor onboard the vehicle 12 and configured to obtain sensor data used to detect an information about the vehicle's environment and/or operation so as to inform one or more of the vehicle's autonomous operations, such as throttle control, brake control, steering control, and blinker or turn indicator control, for example. The autonomous vehicle sensor(s) 34 may include: LiDAR sensors for creating detailed 3D maps of the environment and detecting obstacles; radar sensors for identifying the speed and location of other vehicles; cameras for recognizing traffic signs, signals, and lane markings; ultrasonic sensors for detecting objects in close proximity; global navigation satellite system (GNSS) (e.g., global positioning system (GPS)) receiver for precise navigation used for routing; of course, these are just examples as other autonomous vehicle sensors may be used, as discussed below.

Those skilled in the art will appreciate that autonomous vehicles generally employ a myriad of advanced sensors to navigate and interact safely with their surroundings, such as those examples provided herein. It will be appreciated that other sensors for informing the vehicle's autonomous operation may be used, according to embodiments. The sensor data captured by the autonomous vehicle sensor(s) 34 may be communicated over the onboard communications network 46. Also, it will be appreciated that there may be an overlap between the emergent situation sensor(s) 32 and the autonomous vehicle sensor(s) 34 in that one or more of the emergent situation sensor(s) 32 may also be considered an autonomous vehicle sensor.

The sensor data acquisition controller 36 is a controller that is configured to acquire sensor data from the communications bus 48 and provide the acquired sensor data to the sensor data queue manager 38 for distribution or use by one or more other vehicle components, such as the advanced data processing unit 42 and the wireless communications transceiver 44, for example. The sensor data acquisition controller 36 includes at least one processor and memory storing computer instructions that, when carried out by the at least one processor, cause the sensor data acquisition controller 36 to perform its intended functionality as discussed herein. In embodiments, the sensor data queue manager 38 may be implemented as a part of the sensor data acquisition controller 36, or may be implemented as a separate device with its own processor, for example.

In embodiments, the sensor data acquisition controller 36 includes or is at least communicatively coupled to a sensor array interface device, such as a sensor array interface module (SAIM) that serves a connective piece between the captured sensor data communicated over the communications bus 48 and the sensor data acquisition controller 36. The SAIM is often built on microcontroller-based hardware, often utilizing Real-Time Operating Systems (RTOS) to manage sensor inputs efficiently, and this may include using a microcontroller like an ARM Cortex-M series that runs software written in C or C++, for example. In embodiments, the communications bus 48 is a high-speed data bus (HDB), which may be implemented using technologies like CAN (Controller Area Network) bus for low-latency requirements or ethernet for higher data throughput, for example, and may be responsible for the rapid and secure transmission of sensor data to downstream components, such as the advanced data processing unit 42 and/or the wireless communications transceiver 44. The architecture used for the SAIM may include hardware accelerators for encryption and checksum computations to ensure data integrity and security, for example, while the sensor data acquisition controller 36 may use a more powerful processor, such as, for example, a field-programmable gate array (FPGA) or an application-specific integrated circuit (ASIC). The sensor data acquisition controller 36 may run on firmware designed for specific data preprocessing tasks, including filtering and timestamping, for example. This firmware may be written in any suitable language, such as VHDL or Verilog for FPGAs, or C/C++ for ASICs, for example. Together, the communications bus 48, the SAIM, and the sensor data acquisition controller 42 form an integrated pipeline, converting raw sensor readings into structured, synchronized data packets suitable for higher-level computational tasks, at least according to embodiments.

The sensor data queue manager 38 is used to manage the data acquired by the sensor data acquisition controller 36, including storing this data into the sensor data store 40. The sensor data queue manager 38 is shown as being communicatively coupled to the sensor data acquisition controller 36, the advanced data processing unit 42, and the wireless communications transceiver 44. The sensor data queue manager 38 may be referred to as a Sensor-to-Processing Queue Manager (SPQM), and may act as a data broker between the sensor data acquisition controller 36 and the advanced data processing unit 42 and/or the wireless communications transceiver 44. According to embodiments, the sensor data queue manager 38 is implemented using a high-performance message queuing service like Apache Kafka™ or RabbitMQ™, or may be implemented using custom-designed software. Given its role in managing data flow, the sensor data queue manager 38 may be designed to be scalable and capable of handling back-pressure scenarios, ensuring data integrity and availability. Software for the sensor data queue manager 38 may be written in performance-oriented languages like Rust or C++ in order to have improved performance and throughput. According to embodiments, the sensor data queue manager 38 includes at least one processor and memory storing computer instructions that, when carried out by the at least one processor, cause the sensor data queue manager 38 to perform its intended functionality as discussed herein.

In embodiments, the sensor data queue manager 38 may be implemented as a part of the advanced data processing unit 42, such as by executing software implementing the sensor data queue manager 38 on a dedicated processor running within the advanced data processing unit 42; in other embodiments, the sensor data queue manager 38 may be implemented as a separate device with its own processor, for example, as shown in FIG. 1.

The sensor data store 40 is an electronic data store that stores the sensor data captured by the sensor data acquisition controller 36, and may maintain this sensor data for a predetermined amount of time, according to embodiments. The sensor data store 40 may be comprised of any number of memory devices, each of which may be any of a variety of suitable memory devices for holding electronic data, including non-transitory computer-readable mediums as well as transitory or volatile computer-readable mediums. In embodiments, multiple sensor data stores are used with one being a transitory or volatile computer-readable medium for providing scalable quick access to sensor data and another one being a non-transitory computer-readable medium for persistent storage of sensor data, such as selected portions of the sensor data. In embodiments, the sensor data store 40 is a part of the advanced data processing unit 42, or a portion thereof, such as the non-volatile computer-readable medium, is a part thereof.

The advanced data processing unit 42 is used to perform sensor data processing of the sensor data, such as for purposes of determining and/or causing performance of one or more autonomous operations of the vehicle 12. According to embodiments, the advanced data processing unit 42 includes at least one processor and memory storing computer instructions that, when carried out by the at least one processor, cause the advanced data processing unit 42 to perform its intended functionality as discussed herein. The advanced data processing unit 42 may correspond to an autonomous controller for controlling vehicle operation, and may include a dedicated processor. In embodiments, the advanced data processing unit 42 is used as a computational engine for complex sensor data fusion and decision-making algorithms, such as for determining autonomous operations of the vehicle 12; in embodiments, the advanced data processing unit 42 is an autonomous vehicle controller. Typically built on high-end CPUs, GPUs, or even TPUs (Tensor Processing Units) for machine learning tasks, the advanced data processing unit 42 often uses a robust software stack, including, for example, a specialized real-time operating system (RTOS) or even a Linux-based environment tailored for high-performance computing. The algorithms running on the advanced data processing unit 42 are often written in languages like C++, Python, specialized machine learning frameworks like TensorFlow™ or PyTorch™, or some combination thereof.

The wireless communications transceiver 44 is an electronic device that is used for carrying out wireless communications, such as cellular carrier communications (or other long-range wireless communications) and/or dedicated short-range communications (DSRC) (e.g., Wi-Fi™, Bluetooth™) (or other short-range wireless communications). In embodiments, the wireless communications transceiver 44 is implemented as a telematics unit and includes a cellular chipset used for cellular carrier communications, such as for communicating with an end point through use of cellular infrastructure. In other embodiments, the wireless communications transceiver 44 includes DSRC circuitry, such as a Bluetooth™ chipset, for communications via DSRC technology. The wireless communications transceiver 44 is used to provide information to the responder subsystem 16, such as for providing sensor data, an emergent situation indicator, or other vehicle state information to the responder computer 18.

The processors discussed herein are each an electronic processor, and may be any suitable electronic processor, such as: x86/x86-64 processors, such as Intel™ Core series and AMD Ryzen™ series, widely adopted in the personal computing domain; or ARM processors, such as Qualcomm Snapdragon™, NVIDIA Tegra™, and Apple M1™ processors, common for mobile and embedded systems. It will be appreciated that these are examples, as other electronic processors may be used.

The memory discussed herein, unless otherwise expressly stated, is a non-transitory, computer-readable memory that is implemented as a non-volatile computer data storage device, such as, for example, ROM (read-only memory), solid-state drives (SSDs) (including other solid-state storage such as solid-state hybrid drives (SSHDs)), other types of flash memory, hard disk drives (HDDs), magnetic or optical disc drives, non-volatile random access memory (NVRAM), etc.

Transitory computer-readable mediums discussed herein may include volatile random access memory (RAM) (non-NVRAM), for example.

The interconnected communications network 20 is used for enabling communications between the vehicle 12 and the responder subsystem 16, specifically, the wireless communications transceiver 44 and the responder computer 18. The interconnected communications network 20 is shown as a single cloud icon in FIG. 1, as those skilled in the art will appreciate that any suitable data communications network may be used as the interconnected communications network 20, and this oftentimes involves use of cellular infrastructure and/or internet infrastructure. Here, "cellular infrastructure" refers to cell towers, mobile switching centers, carrier core networks, and other equipment and/or components used for carrying out cellular communications. And, here, "internet infrastructure" refers to one or more interconnected computer networks that use the Internet protocol (IP) suite (e.g., TCP/IP, UDP/IP) to communicate between networks and devices so as to facilitate data exchange. In embodiments, other infrastructures and/or any combination thereof may be used as well for the interconnected communications network 20.

Figure 2:
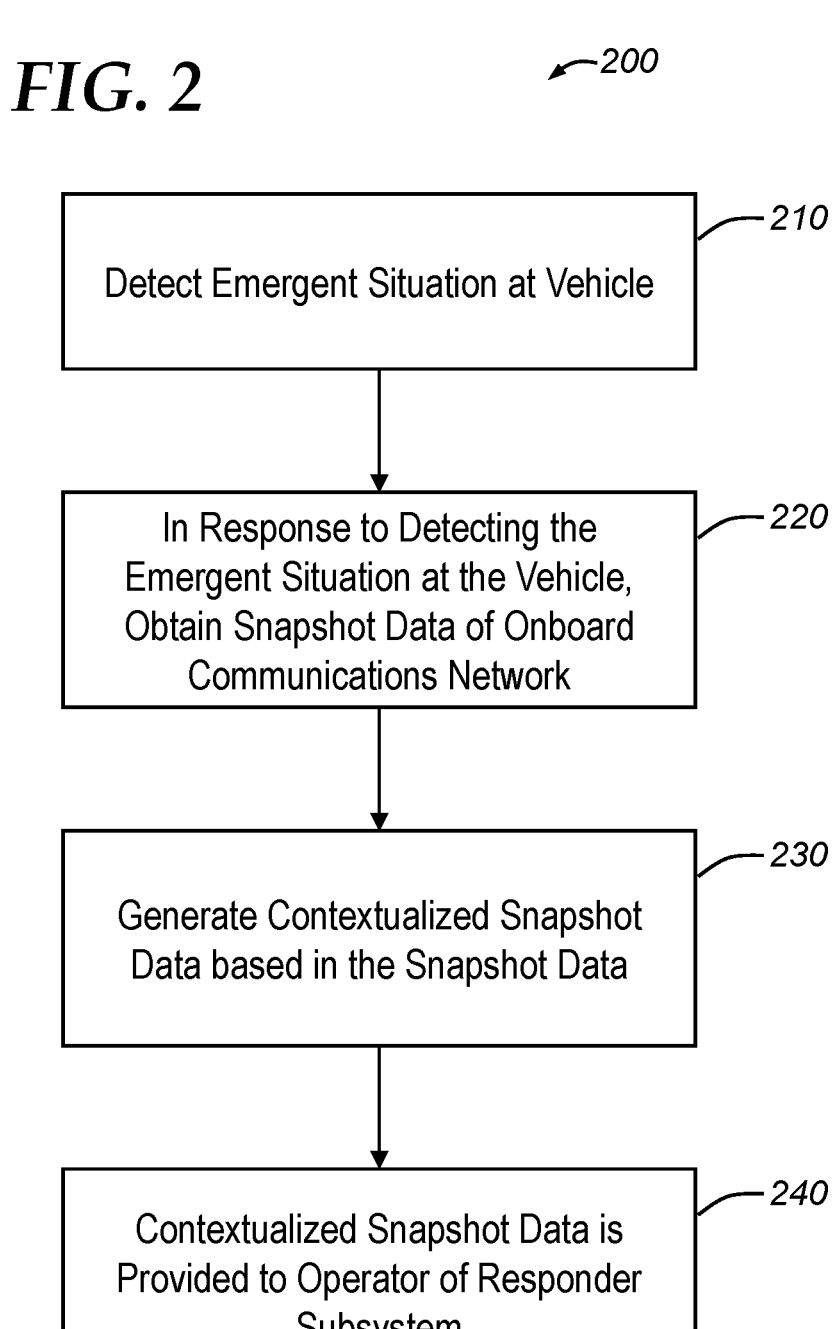
FIG. 2 is a flowchart illustrating a method of facilitating a response to an emergent situation at a vehicle, according to one embodiment.

With reference to FIG. 2, there is shown a method 200 of facilitating a response to an emergent situation at a vehicle, according to one embodiment. The method 200 is carried out by the vehicle communications system 10 and, specifically, the emergent situation vehicle response system 22, at least in some embodiments, as discussed below. According to embodiments, the method 200 may be modified to omit one or more of the steps, such as step 230, or may include one or more other steps.

The method 200 begins with step 210, wherein an emergent situation is detected at a vehicle. As used herein, an "emergent situation" is defined as any event or condition presenting an immediate threat to the safety, operation, or functionality of the vehicle, its occupants, other road users, or adjacent property. Examples include mechanical failures, system malfunctions, collisions, unpredictable obstacles or road conditions, or scenarios necessitating immediate human intervention due to the incapacity of the vehicle's autonomous systems or the onboard driver to resolve the situation adequately.

The emergent situation is detected based on sensor data from one or more of the emergent situation sensor(s) 32, such as through detecting when an inertial measurement exceeds a predetermined threshold value. In embodiments, one of the emergent situation sensor(s) provides sensor data over the communications bus 48, which may then be stored in the sensor data store 40, such as through use of the sensor data acquisition controller 36, as discussed above. According to embodiments, the advanced data processing unit 42 is used to obtain the sensor data captured by the emergent situation sensor and to then determine whether the sensor data (maybe in combination with other data known or made available to the advanced data processing unit 42) indicates an emergent situation. In embodiments, other components of the vehicle electronics 14 may be used to process the sensor data captured by the emergent situation sensor(s) 32 in order to detect an emergent situation, including those modules shown in FIG. 1 or even other modules or electronics not shown, such as a dedicated safety control module. The method 200 continues to step 220.

In step 220, in response to detecting the emergent situation at the vehicle, snapshot data is obtained. The snapshot data provides a snapshot at a given moment of sensor data being transmitted over an in-vehicle communications network, specifically, the communications bus 48. For example, where the communications bus 48 is a CAN bus, the snapshot data is CAN snapshot data providing a snapshot of the data being communicated over the CAN bus at a given moment. As another example, where the communications bus 48 is an ethernet bus, the snapshot data is ethernet snapshot data providing a snapshot of the data being communicated over the ethernet bus at a given moment. According to embodiments, the snapshot data is obtained using the sensor data acquisition controller 36, as discussed above, which may include using of a SAIM and which may result in the snapshot data being passed to the sensor data queue manager 38 and stored in the sensor data store 40.

The snapshot data includes vehicle operating values at a point or moment in time, and these vehicle operating values may differ from those used to detect the emergent situation in step 210. In embodiments, the vehicle operating values include sensor data, such as raw sensor values, from at least one sensor that is different than (not one of) the one or more sensors used to detect the emergent situation. The point in time at which the snapshot data pertains is a time that is within one second (or two seconds in other embodiments) after detection of the emergent situation (after step 210), at least in embodiments. The method 200 continues to step 230.

In step 230, contextualized snapshot data is generated based on the snapshot data. The contextualized snapshot data is a contextualized representation of the snapshot data that is generated by transforming (raw) sensor values from the snapshot data into semantically meaningful and interpretable outputs, such as those that are readily understandable by the operator or other human being. For example, the contextualized snapshot data includes a classification of a physical phenomenon that is determined based on classifying one or more of the raw sensor values into a class of a plurality of predetermined classes. For example, image data captured by a camera is processed using a classifier configured to detect emergencies, such as a pedestrian lying down in or next to the road; in embodiments, the classifier may be implemented as a convolutional neural network (CNN) trained on annotated training data comprising image data and classifications for respective portions of the image data. As another example, detection of an inertia or force over a predetermined amount indicates an accident whereas forces equal to or less than the predetermined amount indicates no accident-inertial measurement unit (IMU) sensor values are processed by comparing them to the threshold and are classified accordingly as accident or no accident. Of course, other sensors, types of sensors, and processing may be used in order to generate the contextualized snapshot data. In embodiments, multiple different types of sensor data (e.g., image data being of a different type than inertia or force data) are used to generate the contextualized snapshot data.

At least in embodiments, generating the contextualized snapshot data includes generating a semantically-interpretable value based on one or more raw sensor values of the snapshot data; accordingly, in some embodiments, a plurality of semantically-interpretable values are generated as the contextualized snapshot data. The semantically-interpretable value is adapted to be readily-interpretable by a human through conveying text, audio, or a graphic representing a semantic meaning of the one or more raw sensor values, thereby readying the operator's interpretation, reducing latency in emergent situation decision making of the operator and, accordingly, in responding to the emergent situation.

In at least one embodiment, one or more of the semantically-interpretable values are generated at the vehicle. For example, the advanced data processing unit 42 is used to obtain the snapshot data from the sensor data store 40 and processed to make the classifications or other semantically-interpretable values. In another embodiment, one or more of the semantically-interpretable values are generated at the responder subsystem 16, such as at the responder computer 18. For example, the wireless communications transceiver 44 is used to obtain the snapshot data from the sensor data store 40, to package the snapshot data for transmission, and to then transmit the snapshot data (as appropriately packaged) over the interconnected communications network 18; in such an example, the transmitted snapshot data is received at the responder subsystem 16 and then processed to generate the classifications or other semantically-interpretable values. And, in some embodiments, a combination of in-vehicle and remote processing may be used whereby both the vehicle 12 and the responder subsystem 16 each provide a portion of the contextualized snapshot data, such as through having the advanced data processing unit 42 generate a first semantically-interpretable value and the responder computer 18 generate a second semantically-interpretable value.

In some embodiments, the vehicle 12 may also transmit other vehicle state information to the responder subsystem 16, such as one or more recently-performed and/or planned autonomous vehicle operations, which may include a vehicle's travel history (e.g., indicated by a trajectory over a geographic region taken over a period of time), a vehicle's autonomous operation history (e.g., indications of one or more autonomous actions such as turning or accelerating the vehicle with an associated time and/or location), and/or a vehicle's determined next or planed autonomous operation (s) (such as one or more of the last or most-recent autonomous operations determined to be performed by the vehicle, which may be forgone in light of the emergent situation, at least in some scenarios). In embodiments, such as where the vehicle generates the contextualized snapshot data, the vehicle may include this vehicle state information in the contextualized snapshot data. And, in embodiments where the contextualized snapshot data is generated at the responder subsystem 16, the responder subsystem 16 may receive vehicle state information from the vehicle 12, and then include in (or at least use this information for generating) the contextualized snapshot data. Such information pertaining to the autonomous operation of the vehicle is referred to as vehicle state information indicating an autonomous state of the vehicle or simply autonomous vehicle state information. The method 200 continues to step 240.

In step 240, the contextualized snapshot data of the sensor data is provided to an operator of a responder subsystem. The responder subsystem 16 is configured to present the contextualized snapshot data as well as an indication of the emergent situation to an operator, whereby the snapshot data is presented in a manner so as to facilitate determination and/or execution of a responsive action to be performed by the operator by virtue of its contextualized and readily semantically-interpretable values. In embodiments, the remote computer 18 may use any of a variety of HMIs to communicate this information to the operator, such as through providing a graphical user interface (GUI) on an electronic display of the responder computer 18 where the GUI has one or more graphics presenting the semantically-interpretable values representing a semantic meaning of the one or more raw sensor values. Examples of responsive actions by the operator include: informing emergency services (e.g., ambulance services, police, firefighters); placing a call or otherwise establishing an audio and/or video call with a driver or other passenger of the vehicle 12; and sending a command to the vehicle 12 to thereby cause the vehicle 12 to perform an action so as to reduce or mitigate a chance or extent of damage or harm to the vehicle 12, passengers or other individuals present in or around the vehicle, and/or other vehicles or other external objects nearby the vehicle 12. The method 200 then ends.

What is claimed is:

1. A method of facilitating a response to an emergent situation at a vehicle, comprising:

detecting an emergent situation at a vehicle via a data processing unit onboard the vehicle;

in response to detecting the emergent situation at the vehicle, obtaining snapshot data that is generated based on a snapshot of sensor data being transmitted over an onboard communications network and stored in a sensor data store onboard the vehicle;

generating contextualized snapshot data based on the snapshot data, wherein the contextualized snapshot data is a contextualized representation of the snapshot data that is generated by classifying one or more raw sensor values from the snapshot data into a class of a plurality of predetermined classes; and providing, from a wireless communications device onboard the vehicle, the conceptualized snapshot data and an indication of the emergent situation to a responder subsystem located remotely and separate from the vehicle.

2. The method of claim 1, wherein the emergent situation is detected based on sensor data from one or more sensors.

3. The method of claim 2, wherein the snapshot of the sensor data communications includes one or more vehicle operating values captured by one or more other sensors that are separate from the one or more sensors used to detect the emergent situation.

4. The method of claim 3, wherein at least one of the one or more other sensors used to capture the one or more vehicle operating values is an autonomous vehicle sensor configured to capture sensor data for use in performing one or more autonomous operations for the vehicle.

5. The method of claim 4, wherein vehicle state information indicating an autonomous state of the vehicle is provided to the responder subsystem and used to generate the snapshot data that is provided to the responder subsystem.

6. The method of claim 5, wherein the autonomous state of the vehicle indicates a planned autonomous operation of the vehicle that was not yet performed by the vehicle.

7. The method of claim 5, wherein the autonomous state of the vehicle indicates an autonomous operation that was performed by the vehicle prior to detecting the emergent situation.

8. The method of claim 1, wherein the snapshot data represents vehicle operating values at a point in time.

9. The method of claim 8, wherein the point in time is a time that is not more than two (2) seconds after the emergent situation is detected at the vehicle.

10. The method of claim 8, wherein the point in time is a time that is not more than one (1) second after the emergent situation is detected at the vehicle.

11. The method of claim 8, wherein the snapshot of sensor data is a snapshot of a communications bus over which the sensor data is transmitted.

12. The method of claim 11, wherein the communications bus is a controller area network (CAN) bus or an ethernet bus.

13. The method of claim 1, wherein the communications bus is a controller area network (CAN) bus, wherein the snapshot data is CAN snapshot data that is obtained from a sensor data store, and wherein the vehicle is configured to store a CAN snapshot of data being communicated over the CAN bus according to a time interval.

14. The method of claim 13, wherein the time interval is a static predetermined amount of time.

15. The method of claim 13, wherein the CAN snapshot data is generated based on one or more most recent CAN snapshots of data stored in the sensor data store.

16. The method of claim 15, wherein the sensor data store is a transitory computer-readable medium, and wherein the CAN snapshot data is stored in a non-transitory computer-readable medium in response to detecting the emergent situation at the vehicle.

17. The method of claim 1, wherein the step of obtaining the snapshot data is accomplished with a wireless communications transceiver that is onboard the vehicle and that obtains the snapshot data from the sensor data store and wherein the wireless communications transceiver is the wireless communications device.

18. The method of claim 1, wherein the contextualized snapshot data includes generating a semantically-interpretable value based on one or more raw sensor values of the snapshot data, wherein the semantically-interpretable value is adapted to be readily-interpretable by a human through conveying text, audio, or a graphic representing a semantic meaning of the one or more raw sensor values, and wherein the semantically-interpretable value is provided to an operator of the responder subsystem.

19. An emergent situation vehicle response system, comprising:

vehicle electronics of a vehicle, including at least one sensor and an onboard communications network for transmitting sensor data captured by the at least one sensor, the onboard communications network including a wireless communications device; and a responder subsystem having a responder computer configured to provide electronic data to an operator stationed at the responder computer, the responder computer being located remotely and separate from the vehicle electronics;

wherein the emergent situation vehicle response system is configured to execute computer instructions that, when executed by one or more electronic processors, cause the emergent situation vehicle response system to:

detect an emergent situation at the vehicle via a data processing unit onboard the vehicle;

in response to detecting the emergent situation at the vehicle, obtain snapshot data that is generated based on a snapshot of the sensor data captured by the at least one sensor as the sensor data is being transmitted over an onboard communications network and stored in a sensor data store onboard the vehicle;

generate contextualized snapshot data based on the snapshot data, wherein the contextualized snapshot data is a contextualized representation of the snapshot data that is generated by classifying one or more raw sensor values from the snapshot data into a class of a plurality of predetermined classes; and provide, from the wireless communications device, the conceptualized snapshot data and an indication of the emergent situation to the responder computer.

20. The system of claim 19, wherein the data processing unit and the responder computer each provide a portion of the contextualized snapshot data with the data processing unit providing a first semantically-interpretable value and the responder computer providing a second semantically-interpretable value.

\* \* \* \* \*